(12) United States Patent
O'Donnell

(10) Patent No.: US 6,198,918 B1
(45) Date of Patent: Mar. 6, 2001

(54) INTELLIGENT CELL RECOVERY

(75) Inventor: Owen O'Donnell, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/185,745

(22) Filed: Nov. 4, 1998

(51) Int. Cl.[7] ................................... H04Q 7/20
(52) U.S. Cl. ..................... 455/424; 455/8; 455/446; 455/67.1
(58) Field of Search ................... 455/8, 9, 423, 455/424, 446, 449, 450, 67.1

(56) References Cited

U.S. PATENT DOCUMENTS 5,625,866 * 4/1997 Lidbrink et al. ............ 455/67.1

FOREIGN PATENT DOCUMENTS 0 708 573 A2 4/1996 (EP).
WO96/42177 12/1996 (WO).
WO97/24896 7/1997 (WO).

OTHER PUBLICATIONS

Robin Smith et al., "Distributed Management of Future Global Multi–Service Networks," British Telecommunications Engineering, vol. 13, Oct. 1994, pp. 221–226.

* cited by examiner

Primary Examiner—Nguyen Vo
(74) Attorney, Agent, or Firm—Burns, Doane, Swecker & Mathis, L.L.P.

(57) ABSTRACT

A technique for restoring operation to a plurality of cells within a wireless communication system includes the step of estimating the traffic within each cell to provide a plurality of traffic measurements. These traffic measurements are stored. In the event of a disruption in service provided by the communication system, the measurements are retrieved. The system then restores operation to cells within the wireless communication system in an order based on the retrieved traffic measurements, e.g., such that the cell which had the heaviest traffic at the time of system disturbance is restored before other cells. This maximizes the revenue produced by the system and minimizes customer dissatisfaction.

28 Claims, 4 Drawing Sheets

216

| B1 | T1 |
|----|----|
| B2 | T2 |
| B3 | T3 |
| B4 | T4 |
| B5 | T5 |
| B6 | T6 |
|    | ⋮  |
| BN | TN |

FIG. 3

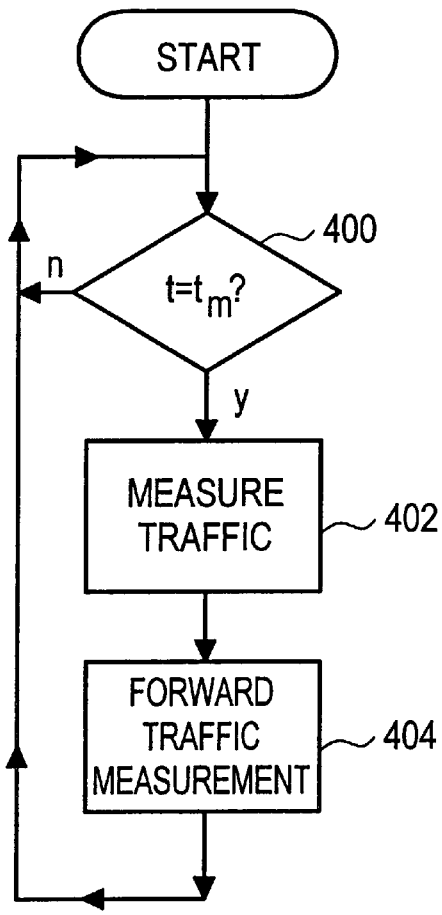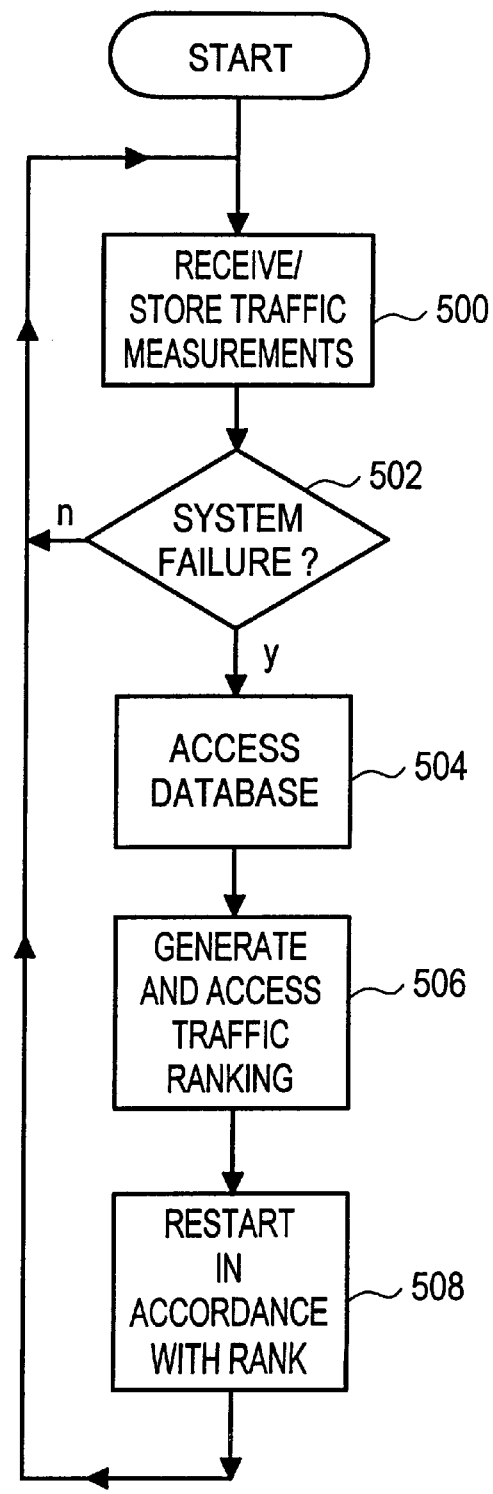

INTELLIGENT CELL RECOVERY

BACKGROUND

1. Field of the Invention

This invention relates to a method and apparatus for restoring operation to cells within a radiocommunication network after a system disturbance, and more particularly, to a method and apparatus for scheduling recovery of cells within a radiocommunication network based on the anticipated traffic density within each cell immediately following recovery.

2. Discussion of Related Art

An exemplary cellular radio communication system is illustrated in FIG. 1. As shown there, a geographic region served by the system is subdivided into a number of cells, each containing a base station. In this exemplary case, there are ten cells C1≧C10 including base stations B1–B10, respectively. Although the cells are shown as having a hexagonal shape, this is merely a graphical convention; in actuality, the cells may have a variety of "shapes" depending on the terrain covered by the cell and the characteristics of the antenna used by the cell's base station. Although not shown, each cell is also typically divided into a plurality of sectors which are serviced by a respective plurality of base station sector antennas.

Mobile terminals M1–M10 are shown scattered throughout the geographic coverage area encompassed by cells C1–C10. Each mobile terminal typically communicates with its nearest base station, using, for instance, frequencies assigned to that base station. The base stations of adjacent cells use different frequencies so as to reduce interference between neighboring cells. When a mobile terminal moves from one cell to another, the system will transfer any ongoing call to the new cell. Alternatively, in the Code Division Multiple Access (CDMA) protocol (e.g., in the IS-95 standard), all cells share a common wide-band channel. In this protocol, a mobile terminal can simultaneously communicate with plural base stations during handoff from one cell to another.

As illustrated in FIG. 1, base stations B1–B10 are coupled to a mobile services switching center (MSC), which provides a connection to a public switched telephone network (PSTN) (not shown), which, in turn, provides connection to various communication devices, such as a telephone handset, terminal, etc. (not shown).

Various safeguards can be taken to ensure the continuity of radiocommunication service provided by the network. Nevertheless, interruptions in service can and do occur. These interruptions may be due to the deliberate actions of a system operator, or may be caused by various system failures. For instance, planned interruptions may be used to perform maintenance on the system or to make upgrades. Failures may be attributed to transmission and other processing errors, power failures, component failures, etc. Whatever the cause, these interruptions result in a temporary blocking of communication services provided by the entire system or parts thereof. In the following discussion, the term "disruption" (or "disturbance") is used to describe these interruptions in service, which encompasses any type of planned or unplanned interruption in service.

After a disruption, the communication service provided in each cell must be restored. Cells are typically restored sequentially, such that operation is restored to the network on a cell-by-cell basis. (This is because, at the present time, restoring all of the cells at the same time is not feasible, because it would impose a large processing burden on the system.) In one technique, operation is restored to the cells in a random order, such that no cell is given priority over other cells when powering up the cells. In a second technique, cells are restored according to a fixed schedule.

The above-described techniques for restoring operation to the radiocommunication cells have a number of drawbacks. With reference to FIG. 1, traffic may differ from cell to cell. For instance, there may be more traffic in cell C1 than in adjacent cell C2 because, for instance, cell C1 corresponds to a heavily populated urban area while cell C2 corresponds to a more rural area. In the first mentioned technique, power is restored on a random basis, such that any one of cells C1–C10 is powered up first. This means that the busiest cell, C1, may not be powered up first. This can result in a loss of revenue for the system operator, since the cell with the greatest potential demand for service (e.g., the potential number of calls) is not necessarily restored first. Also, users of mobile terminals are understandably disturbed when they are unable to initiate or receive calls during a system disturbance. Restoring operation to cells in a random order does not minimize this disturbance, since, again, the cell with the greatest number of potential calls is not necessarily restored first.

The second technique addresses some of these concerns by, for instance, allowing the system to restore power to a cell which serves an urban area before a cell which serves a rural area. Yet this provision may not be enough to account for the complexity in traffic patterns within a coverage area. As mentioned, the exemplary cell C1 corresponds to an urban area, and therefore may have greater traffic than adjacent rural cell C2. However, assume that cell C1 correspond to a business district within a city which has heavy call traffic during normal working hours, but otherwise has relatively low traffic. Accordingly, cell C1 may have heavier call traffic than cell C2 during the middle of the day, but the traffic of cell C2 might exceed that of cell C1 at other times. For instance, if cell C2 included a major roadway into the urban area C1, the traffic in cell C2 could conceivably be higher than the traffic in cell C1 during "rush" hours. Similar variable density patterns may be present in other cells, which may be attributed to a variety of reasons, including special unpredictable events which result in an entirely anomalous traffic pattern throughout the coverage area. The end result is that it is difficult to predict which cell may be busiest at any moment, making the second mentioned recovery technique also unsatisfactory.

Hence, it is a general objective of the present invention to provide a method and system for re-establishing operation within cells in a more "intelligent" manner so as to provide more efficient management of the radiocommunication system.

SUMMARY

These and other objectives of the present invention are achieved through an "intelligent" technique for restoring operation to a plurality of cells within a wireless communication system after a system disruption based on the anticipated traffic density within each cell immediately following recovery. The anticipated traffic density can be based on prevailing conditions within the system shortly prior to the time that the system disruption occurred.

The technique includes the step of estimating the traffic within each cell to provide a plurality of traffic measurements. These traffic measurements are stored. In the event of a disruption in service, the measurements are accessed. The system then restores operation to cells within the wireless communication system in accordance with the accessed traffic measurements, e.g., such that the cell which had the heaviest traffic immediately before system disruption is restored before other cells. The remaining cells can then be restored in an order based on their traffic levels just prior to the disruption. That is, after the cell with the heaviest traffic is restored, the cell with the second highest traffic is restored, followed by the cell with the third heaviest traffic, etc.

The preferential restoration of cells having the highest anticipated traffic densities maximizes the revenue of the system and minimizes customer dissatisfaction.

BRIEF DESCRIPTION OF THE DRAWINGS

The present invention will now be described with reference to the following drawing figures, in which:

FIG. 3 shows the organization of information in a memory used in the mobile services switching center;

FIG. 4 shows a sequence of steps used by the base station to measure traffic; and FIG. 5 shows a sequence of steps used by the mobile services switching center to select the order for restoring operation to cells.

DETAILED DESCRIPTION

The following description is scripted in terms of a cellular radiotelephone system, which is the preferred embodiment, but the invention is not limited to that environment and may be used in other types of wireless systems, e.g., systems which provide radiocommunication service using satellites, voice-trunked systems such as Land Mobile Radio (LMR) or Special Mobile Radio (SMR) systems, etc. Also, Applicant's invention can use any type of channel allocation technique, such as Time Division Multiple Access (TDMA), Frequency Division Multiple Access (FDMA), Code Division Multiple Access (CDMA) and hybrids of FDMA, TDMA and/or CDMA, as well as those which are defined by any system standard, e.g., GSM, PDC, AMPS, etc.

Figure 1:
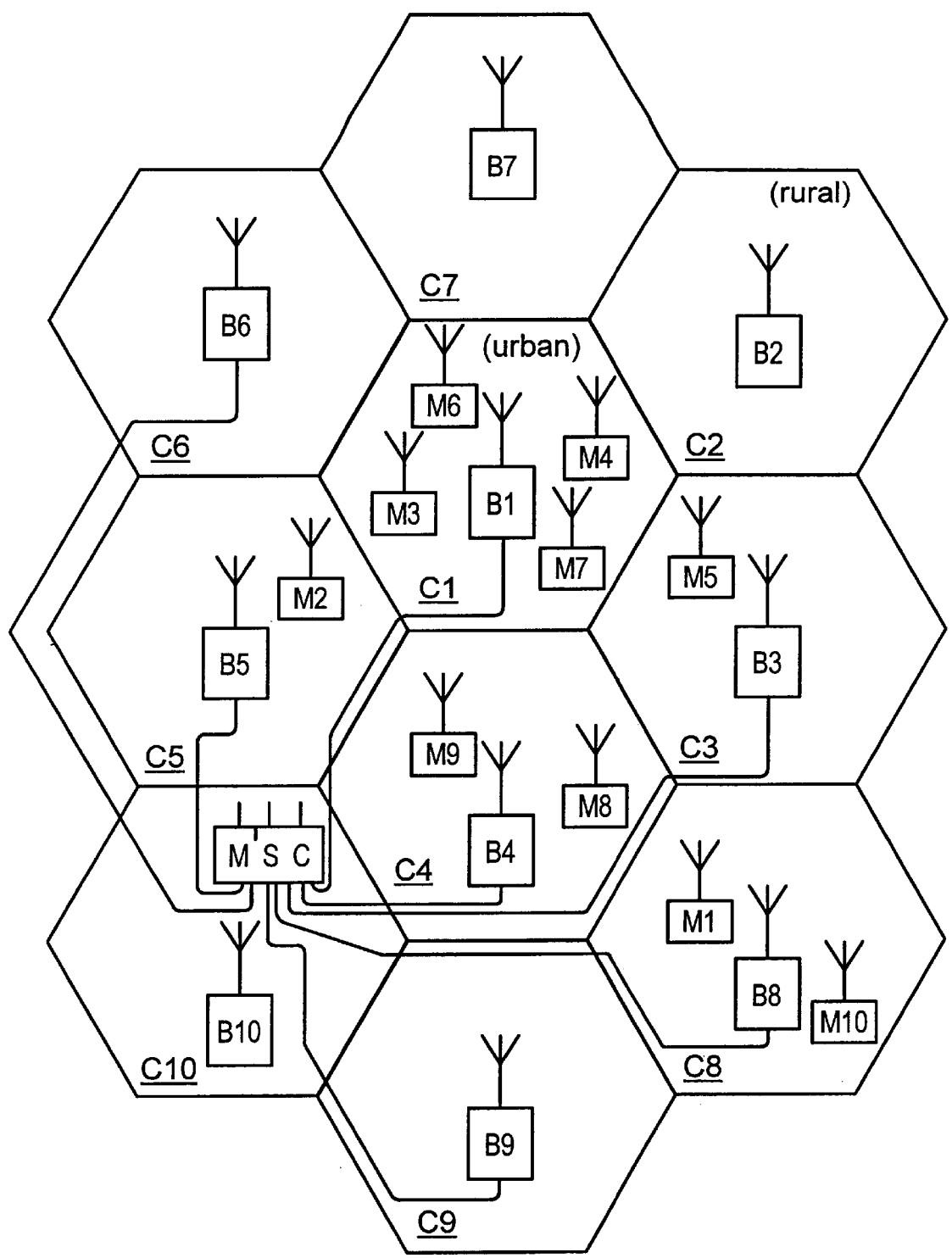
FIG. 1 shows a conventional cellular system comprising a plurality of cells.
Figure 2:
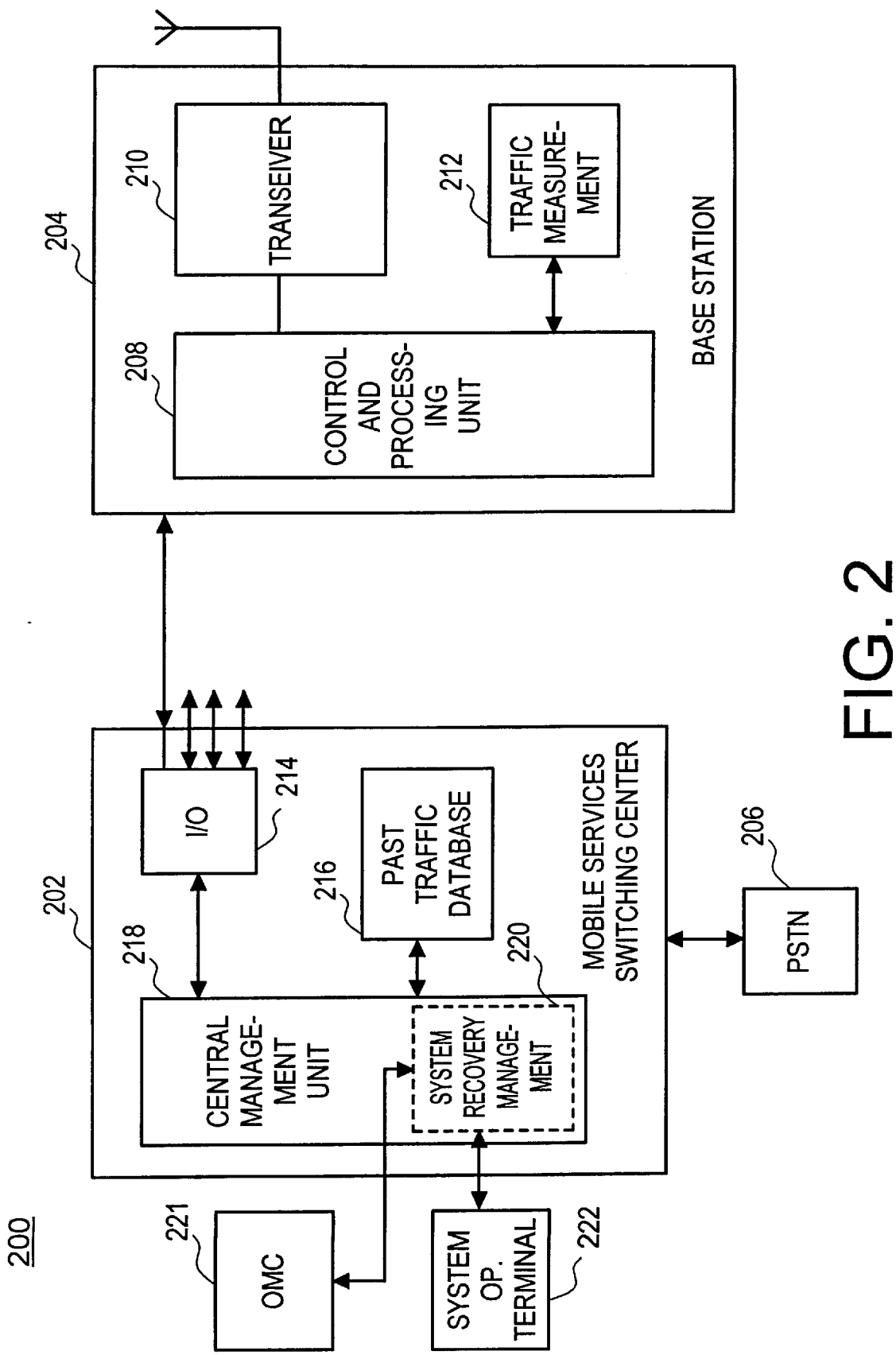
FIG. 2 shows an exemplary base station and mobile services switching center according to the present invention.

FIG. 2 is a block diagram of an exemplary cellular mobile radiotelephone system 200 according to the present invention, which can be used in the exemplary system organization shown in FIG. 1. More specifically, FIG. 2 shows an exemplary base station 204 and mobile services switching center (MSC) 202. The base station includes a control and processing unit 208 which is connected to the MSC 202, which, in turn, is connected to a public switched telephone network (PSTN) 206. General aspects of cellular radiotelephone systems are known in the art, as described by the commonly assigned U.S. Pat. No. 5,175,867 to Wejke et al., entitled "Neighbor-Assisted Handoff in a Cellular Communication System," and U.S. patent application Ser. No. 07/967,027 entitled "Multi-Mode Signal Processing," which was filed on Oct. 27, 1992, both of which are incorporated in this application by reference.

In one exemplary embodiment, the base station 204 can handle a plurality of channels through a transceiver 210, which is controlled by the control and processing unit 208. By way of non-limiting example, in the IS136 standard, the transceiver 210 can handle a plurality of traffic channels and one or more control channels. With respect to the control channel, the transceiver broadcasts control information over this channel to mobiles locked onto that control channel.

The base station 204 can also include a traffic measurement unit 212. As the name suggests, this unit measures the traffic within the base station's cell. Traffic measurements are preferably taken at regular time intervals (e.g., about every 5 seconds), but can be collected on an irregular basis or a continuous basis. The measurements themselves can comprise measurements of any variable which is directly or indirectly proportional to the number of calls currently being handled by the base station. For instance, the measurements can consist of a simple tally of calls in progress which are routed through a particular base station. Alternatively, the measurements might consist of an estimate of traffic within the cell based on prevailing load in the base station (e.g., the prevailing allocation of channel resources with respect to the capacity of the base station). Alternatively, the measurement can consist of an actual sampling of the strength of signals within a particular frequency band within the cell. These measurements generally reflect the "traffic densities" within the respective cells. Although the traffic measurement unit 212 is shown located at the base station, this unit can be located elsewhere, such as at the MSC 202, or at an independent measuring node or station.

Figure 3:
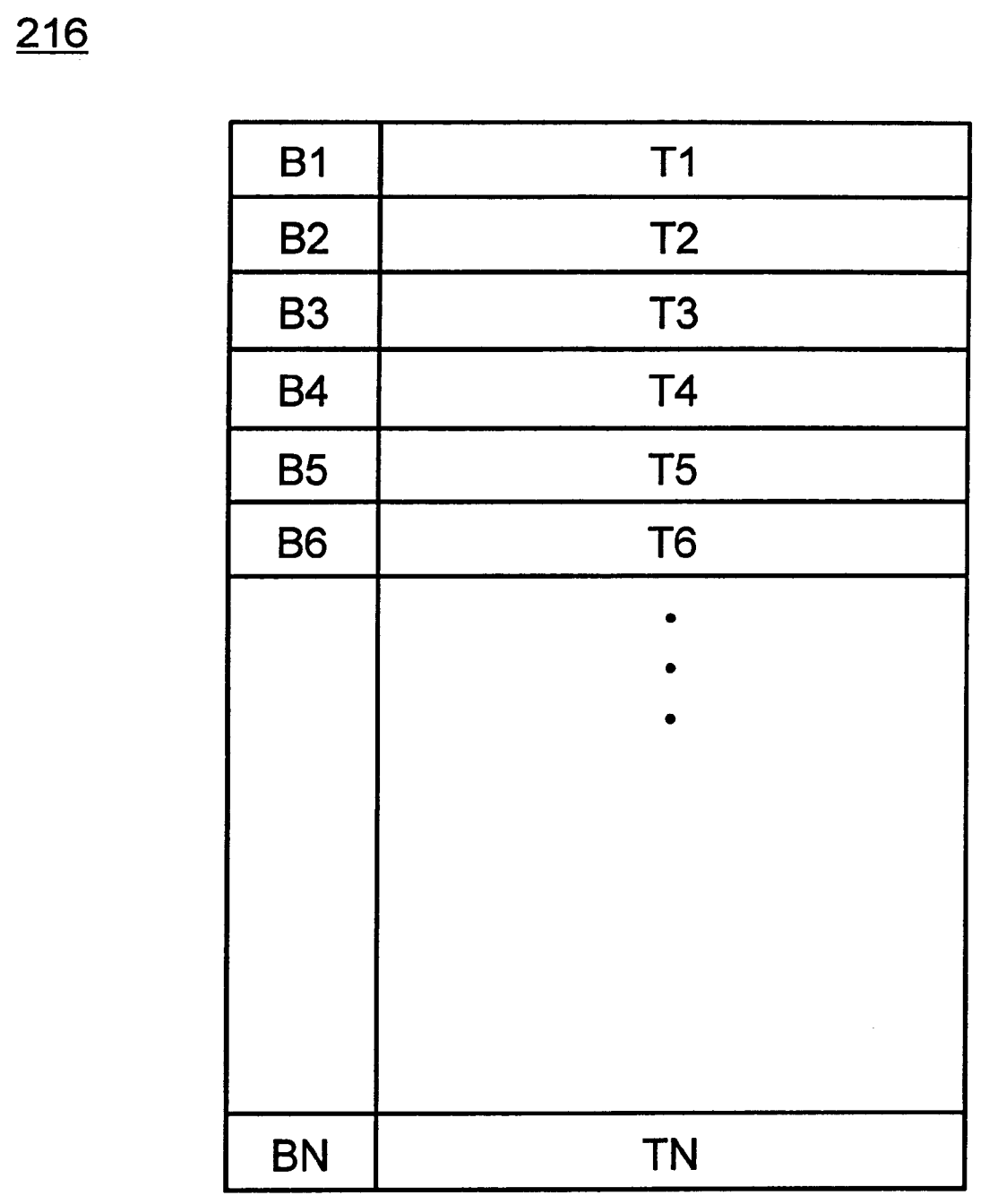

The MSC 202 comprises a system I/0 unit 214 for communicating with the plural base stations B1–B10. The MSC 202 also includes a central management unit 218, which controls the overall operation of the MSC 202. As one component, the management unit 218 includes a system recovery management unit 220 (referred to hereafter as the "recovery unit," for brevity). This unit controls the restoration of operation to the cells within the network when there has been some type of disturbance, such as, but not limited to, a power failure. The recovery unit 220 performs this task by making reference to the traffic database 216. The traffic database 216 stores the measurements made by the traffic measurement units 212 of the base stations. FIG. 3 shows the exemplary contents of memory 216. As indicated there, there are a plurality of traffic measurements T1–TN made by the respective base stations B1–BN. The traffic measurements are indexed by some indicia which represents the corresponding base stations which made the measurements. In one embodiment, the entries in the memory 216 store only the most recent measurement taken by respective base stations. In alternative embodiments, the memory 216 stores a series of past measurements taken by each base station.

Returning to FIG. 2, the recovery unit 220 also can interface with system operator terminal 222 and an Operation and Maintenance Center (OMC) 221. The terminal 222 provides a means by which an operator can monitor the operation of the system, and enter commands to alter the operation of the system. For instance, an operator can command the entire system or parts thereof to power down by entering appropriate commands at the terminal 222. The operator can also request that the base stations make traffic density measurements and forward these measurements to the MSC. These measurements constitute a "snapshot" of what is happening in the system, and can be ordered by the system operator just prior to a planned shut-down. All of these functions can also be performed by an operator at the OMC using a similar input terminal (not shown). Further, although the recovery unit 220 and the traffic database 216 are shown as part of the MSC, these units can be located elsewhere, such as the OMC 221 or a separate node in the system.

Each of the above-described data processing functions performed by the central management unit 218, OMC 221 and base station 204 can be implemented using one or more suitably programmed digital processing units (e.g., computers). Typically, the cellular system will already employ one or more digital processing units. In this case, the above-described data processing functions are preferably principally implemented by modifying the software of these existing digital processing units. However, those skilled in the art will appreciate that the functions can alternatively be implemented in hardware (e.g., discrete logic circuitry), or a combination of software and hardware. The database 216 can be implemented by any type of storage device (e.g., semiconductor or magnetic storage device).

Having described the exemplary structural configuration of the system, its operational characteristics will now be discussed. By way of overview, in the event of a system disturbance for any reason (which may comprise a complete or partial system disruption attributed to any reason), the recovery unit 220 restores operation to the cells in an order based on their traffic levels just prior to the disturbance. The busiest cell is restored first, followed by the next busiest cell, etc., until all cells are restored. Since the recovery scheduling is dynamically based on anticipated traffic density within each cell (as gauged by past traffic density within each cell), this technique will better ensure that the disruption in service negatively affects the least number of callers, maximizing both revenue and customer satisfaction.

FIGS. 4 and 5 describe the technique in greater detail. FIG. 4 pertains to the processing performed in each base station. As shown there, the control and processing unit 208 of the base station determines whether a measurement time interval $t_m$ has transpired (step 400). If so, the base station measures the traffic density prevailing in the cell using the traffic density measurement unit 212 (step 402). This measurement is then forwarded to the MSC 202 (step 404). In an alternative embodiment, the traffic measurements can be performed directly by the MSC 202.

FIG. 5 shows the processing performed by the MSC 202. In step 500, the MSC receives and stores the traffic density measurements transmitted by the base stations. Upon detection of a disturbance (in step 502), the MSC accesses the database 216 (step 504). The MSC then generates the ranking of traffic densities in the cells and accesses this ranking (step 506), and then restores operation to the cells in accordance with the ranking (508). For instance, the busiest cell at the time closest to the disruption in system services is restored first. The actual step of ranking can be performed at any time, and need not directly precede the step of accessing the ranking (that is, the ranking and accessing functions shown in step 506 can be separated).

A number of variations of this basic technique can be employed. The ranking performed in step 506 is based on the most recent measurement of traffic within the cells. Alternatively, the ranking can be based on a running average of measurements from each base station, that is, based on measurements taken over a prescribed moving window of time. For instance, an average for base station B1 can comprise the average of the last "n" measurements taken by base station B1. This average can be stored at any location in the system, including the base station 204, the mobile services switching center 202, the OMC 221, or a separate node.

Also, the ranking can take account of other factors besides the traffic density measurements. For instance, the applicable charge rates may be unequal between cells. Thus, to maximize revenues, the traffic density measurements can be appropriately weighted by the rates involved in the calls within the cell. Further, the algorithm can take account of long-term empirical observations regarding traffic density patterns, e.g., by making reference to a month-by-month historical record of the average traffic density patterns within the cells, or by making reference to a stored calender listing of special events (such as conventions, fairs, etc.) which may result in anomalous traffic patterns.

The user can override the selection of the recovery unit by entering an appropriate command through the system operator terminal 222 or through a similar terminal at the OMC 221.

Further, the time interval $t_m$ need not be fixed, but can vary according to the variance in traffic density in each cell. That is, the time interval $t_m$ can be adjusted such that cells with relatively static traffic density levels are sampled less frequently than cells with more dynamic traffic density levels. In other words, the time interval $t_m$ can be made, e.g., inversely proportional to the variance in traffic density level within a cell. The time interval $t_m$ can be adjusted differently for each cell, or the value of $t_m$ can be based on a system-wide assessment of variance in traffic density levels. The value of $t_m$ can also be made to vary based on other factors, such as time of day (e.g., with the understanding that less calls are placed in certain nighttime hours of system operation). Dynamically adapting the time interval $t_m$ to the variance in system traffic density will reduce measurement load on the system.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for restoring operation to a plurality of cells within a wireless communication system, comprising the steps of:

estimating a traffic density parameter reflecting anticipated traffic density within a cell for each cell to provide a plurality of traffic density parameters;

storing said plurality of traffic density parameters;

in the event of a disruption in service provided by the communication system, accessing said stored traffic density parameters; and restoring operation to cells within said wireless communication system in an order based on said accessed traffic density parameters.

2. The method of claim 1, wherein said estimating step comprises measuring traffic density in each cell, and said traffic density parameters comprise traffic density measurements for respective cells.

3. The method of claim 2, wherein said estimating step comprises measuring traffic density in each cell at constant intervals.

4. The method of claim 2, wherein said estimating step comprises measuring traffic density in each cell at a time interval having a value based on an assessed variance in traffic density within the cell.

5. The method of claim 2, wherein said restoring step comprises a selection of what cell to restore first based on a most recent measurement of traffic density for each cell.

6. The method of claim 2, wherein said order of restoring operation to cells is based on, for each cell, plural recent measurements of traffic density.

7. The method of claim 6, wherein said order of restoring operation to cells is based on, for each cell, an average of said plural recent measurements of traffic density.

8. The method of claim 1, wherein said traffic density parameters reflect empirical observations of traffic densities within said cells over an extended period of time.

9. The method of claim 1, wherein said traffic density parameters reflect anticipated traffic density in at least one cell attributed to a planned event.

10. The method of claim 1, wherein said restoring step comprises ranking the cells from the cell with a highest potential traffic density to the cell with a lowest potential traffic density based on the traffic density parameters, and restoring operation to the cells such that the cell with the highest potential traffic density is restored first and the cell with the lowest potential traffic density is restored last.

11. The method of claim 1, wherein said order in which cells are restored is additionally based on at least one factor other than traffic density.

12. The method of claim 11, wherein said at least one factor includes previous revenue associated with communication within each cell.

13. A wireless communication system for providing communication services to a plurality of cells, comprising:
   means for estimating a traffic density parameter reflecting anticipated traffic density within a cell for each cell to provide a plurality of traffic density parameters;
   means for storing said plurality of traffic density parameters;
   means for accessing said stored traffic density parameters in the event of a disruption in service provided by the communication system; and
   means for restoring operation to cells within said wireless communication system in an order based on said accessed traffic density parameters.

14. The wireless communication system of claim 13, wherein said means for estimating measures traffic density in each cell, and said traffic density parameters comprise traffic density measurements for respective cells.

15. The wireless communication system of claim 14, wherein said means for estimating measures traffic density in each cell at constant intervals.

16. The wireless communication system of claim 14, wherein said means for estimating measures traffic density in each cell at a time interval having a value based on an assessed variance in traffic density within the cell.

17. The wireless communication system of claim 14, wherein said means for restoring comprises means for selecting what cell to restore first based on a most recent measurement of traffic density for each cell.

18. The wireless communication system of claim 14, wherein said order of restoring operation to cells is based on, for each cell, plural recent measurements of traffic density.

19. The wireless communication system of claim 18, wherein said order of restoring operation to cells is based on, for each cell, an average of said plural recent measurements of traffic density.

20. The wireless communication system of claim 13, wherein said traffic density parameters reflect empirical observations of traffic densities within said cells over an extended period of time.

21. The wireless communication system of claim 13, wherein said traffic density parameters reflect anticipated traffic density in at least one cell attributed to a planned event.

22. The wireless communication system of claim 13, wherein said means for restoring comprises means for ranking the cells from the cell with a highest potential traffic density to the cell with a lowest potential traffic density based on the traffic density parameters, and restoring operation to the cells such that the cell with the highest potential traffic density is restored first and the cell with the lowest potential traffic density is restored last.

23. The wireless communication system of claim 13, wherein said order in which cells are restored is additionally based on at least one factor other than traffic density.

24. The wireless communication system of claim 23, wherein said at least one factor includes previous revenue associated with communication within each cell.

25. A wireless communication system for providing communication services to a plurality of cells, comprising:
   plural base stations assigned to respective cells, said base stations including respective traffic measurement units for measuring traffic density within said respective cells to produce traffic measurements;
   a central unit connected to said plural base stations for interacting with said plural base stations;
   means for receiving said traffic measurements;
   means for storing said traffic measurements;
   means for accessing said traffic measurements in the event of a disruption in the operation of the system; and
   means for restoring operation within said system in an order based on said accessed traffic measurements.

26. The wireless communication system according to claim 25, wherein said means for receiving, storing, accessing, and restoring are contained within a common location in said system.

27. The wireless communication system according to claim 26, wherein said common location is said central unit.

28. A central unit for use in a wireless communication system for providing communication to a plurality of cells, comprising:
   means for receiving traffic measurements from a plurality of cells;
   means for storing said traffic measurements;
   means for accessing said traffic measurements in the event of a disruption in the operation of the system;
   means for restoring operation within said system in an order based on said accessed traffic measurements.

* * * * *